(12) United States Patent
Kim et al.

(10) Patent No.: US 11,305,659 B2
(45) Date of Patent: Apr. 19, 2022

(54) ELECTRIC VEHICLE AND COOLING METHOD THEREOF

(71) Applicants: Hyundai Motor Company, Seoul (KR); Kia Motors Corporation, Seoul (KR)

(72) Inventors: Kyung Su Kim, Asan-si (KR); Hyeon Jun Kim, Siheung-si (KR); Yong Hyun Kim, Hwaseong-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 216 days.

(21) Appl. No.: 16/685,421

(22) Filed: Nov. 15, 2019

(65) Prior Publication Data
US 2020/0317072 A1 Oct. 8, 2020

(30) Foreign Application Priority Data

Apr. 3, 2019 (KR) .......................... 10-2019-0038954

(51) Int. Cl.
| | |
|---|---|
| *H02J 7/00* | (2006.01) |
| *H02J 7/14* | (2006.01) |
| *B60L 53/302* | (2019.01) |
| *B60L 53/62* | (2019.01) |
| *H01M 10/613* | (2014.01) |
| *B60H 1/00* | (2006.01) |
| *B60L 58/26* | (2019.01) |

(52) U.S. Cl.
CPC ........ *B60L 53/302* (2019.02); *B60H 1/00278* (2013.01); *B60L 53/62* (2019.02); *B60L 58/26* (2019.02); *H01M 10/613* (2015.04)

(58) Field of Classification Search
USPC ........................................................ 320/109
See application file for complete search history.

(56) References Cited

U.S. PATENT DOCUMENTS

| | | | | |
|---|---|---|---|---|
| 2009/0140698 | A1* | 6/2009 | Eberhard | H02J 7/04 320/152 |
| 2009/0246596 | A1* | 10/2009 | Sridhar | B60L 53/305 429/513 |
| 2012/0043935 | A1* | 2/2012 | Dyer | B60L 55/00 320/109 |

(Continued)

FOREIGN PATENT DOCUMENTS

| | | |
|---|---|---|
| CN | 106532191 A | 3/2017 |
| CN | 106828157 A | 6/2017 |

(Continued)

*Primary Examiner* — Alexis B Pacheco
(74) *Attorney, Agent, or Firm* — Slater Matsil, LLP

(57) ABSTRACT

A cooling method can be used with an electric vehicle that comprises a vehicle charging connection unit connected to an external cable connected to a charger located outside the electric vehicle, a battery configured to be charged through the vehicle charging connection unit, and a pump configured to circulate cooling water to cool the vehicle charging connection unit. The cooling method includes determining whether an amount of cooling water is insufficient and, upon determining that the amount of cooling water is insufficient, restricting a charging rate of charging power supplied through the vehicle charging connection unit.

19 Claims, 6 Drawing Sheets

(56) References Cited

U.S. PATENT DOCUMENTS

| | | | |
|---|---|---|---|
| 2014/0012447 A1* | 1/2014 | Gao | B60L 53/65 |
| | | | 701/22 |
| 2017/0297431 A1* | 10/2017 | Epstein | F01P 5/10 |
| 2018/0198173 A1* | 7/2018 | Ichikawa | H01M 10/486 |
| 2019/0118655 A1* | 4/2019 | Grimes | B60L 3/0046 |
| 2019/0118661 A1* | 4/2019 | Kim | H01M 10/625 |
| 2019/0315243 A1* | 10/2019 | Kodera | B60L 53/66 |
| 2019/0341661 A1* | 11/2019 | Guerra | B60L 53/37 |
| 2020/0247252 A1* | 8/2020 | Dudar | H02J 1/14 |

FOREIGN PATENT DOCUMENTS

| | | |
|---|---|---|
| CN | 107839432 A | 3/2018 |
| CN | 107839433 A | 3/2018 |
| CN | 207433190 U | 6/2018 |
| CN | 207579511 U | 7/2018 |
| CN | 207809075 U | 9/2018 |

\* cited by examiner

ELECTRIC VEHICLE AND COOLING METHOD THEREOF

CROSS-REFERENCE TO RELATED APPLICATIONS

This application claims priority to Korean Patent Application No. 10-2019-0038954, filed on Apr. 3, 2019, which application is hereby incorporated herein by reference.

TECHNICAL FIELD

Embodiments relate to an electric vehicle and a cooling method thereof.

BACKGROUND

In recent years, a high-power charger has been in demand in order to shorten the time required to charge a long-distance electric vehicle (or a battery electric vehicle (BEV)). Here, a high-power charger may be a charger that is configured to supply a high level of power.

When the output level of a charger greatly increases for this reason, an external cable connected to the charger may be damaged by heat generated under the high-output conditions. In order to prevent this phenomenon, a self-cooling system is applied to the external cable. However, when high current is applied to a vehicle charging connection unit of an electric vehicle, to which a charger is connected via an external cable, for a long time, a large amount of heat may be generated by the vehicle charging connection unit. Thus, there is a risk of the vehicle charging connection unit, e.g., an internal cable or an inlet of the vehicle, being damaged by high-temperature heat or catching fire.

SUMMARY

Accordingly, embodiments are directed to an electric vehicle and a cooling method thereof and, in some cases, can substantially obviate one or more problems due to limitations and disadvantages of the related art.

Embodiments provide an electric vehicle and a cooling method thereof capable of charging high power to the electric vehicle in a stable and reliable manner.

In one embodiment, an electric vehicle may include a vehicle charging connection unit connected to an external cable connected to a charger located outside the electric vehicle. The vehicle charging connection unit is disposed in a flow path through which cooling water circulates so as to be cooled by the cooling water, a battery configured to be charged through the vehicle charging connection unit. A pump is disposed in the flow path to circulate the cooling water. A charging control unit is configured to determine whether the amount of cooling water is insufficient and to restrict a charging rate of charging power supplied through the vehicle charging connection unit in response to the determination result.

For example, the charging control unit may include a cooling water determination unit configured to determine whether the amount of cooling water is insufficient and to output a determination result as a determination signal, and a charging rate determination unit configured to restrict the charging rate of the charging power supplied through the vehicle charging connection unit in response to the determination signal.

For example, the cooling water determination unit may include a speed measurement unit configured to measure the actual driving speed of the pump, and a first comparison unit configured to compare the measured actual driving speed with a target driving speed of the pump and to output a comparison result as the determination signal.

For example, the charging control unit may further include a second comparison unit configured to compare predicted heat generation of the vehicle charging connection unit corresponding to the charging power with protective heat generation of the vehicle charging connection unit, in response to the determination signal. The protective heat generation may be heat generation of the vehicle charging connection unit that is to be cooled by an insufficient amount of the cooling water, and the charging rate determination unit may determine the charging rate in response to the comparison result from the second comparison unit.

For example, the charging control unit may further include a power determination unit configured to determine whether the charging power is high power having a level of 50 kW or more, and the cooling water determination unit may operate in response to the determination result from the power determination unit.

For example, the electric vehicle may further include a cooling water circulation path through which the cooling water circulates to cool a power electronic part, the battery, and the vehicle charging connection unit, the cooling water circulation path may include a plurality of circulation paths, and the plurality of circulation paths may be separated from each other or integrated with each other using a valve.

For example, the electric vehicle may further include a cooling water control unit configured to control the valve such that, if the battery and the vehicle charging connection unit are placed in different circulation paths when the vehicle charging connection unit is cooled, the battery and the vehicle charging connection unit are placed in the same circulation path.

For example, the electric vehicle may further include a cooling water control unit configured to control the valve such that, when the vehicle charging connection unit is cooled, a circulation path, other than a circulation path in which the vehicle charging connection unit is placed, is integrated with the circulation path in which the vehicle charging connection unit is placed.

For example, the charging control unit may track a change in the temperature of the vehicle charging connection unit that is determined in advance in accordance with charging conditions under which the battery is to be charged, and may restrict the charging rate with reference to the tracking result so that the battery is charged within the shortest period of time under a condition in which the temperature of the vehicle charging connection unit becomes equal to or lower than a predetermined temperature. The charging conditions may include at least one of a charging voltage, a charging current, a charging time, or a time point at which the charging rate is restricted.

In another embodiment, a cooling method of an electric vehicle, which includes a vehicle charging connection unit connected to an external cable connected to a charger located outside the electric vehicle, a battery configured to be charged through the vehicle charging connection unit, and a pump configured to circulate cooling water to cool the vehicle charging connection unit, may include determining whether the amount of cooling water is insufficient (step (a)), and upon determining that the amount of cooling water is insufficient, restricting a charging rate of charging power supplied through the vehicle charging connection unit (step (b)).

For example, step (a) may include measuring the actual driving speed of the pump, comparing the measured actual driving speed with a target driving speed of the pump, and upon determining that the actual driving speed is higher than the target driving speed, determining that the amount of cooling water is insufficient.

For example, the target driving speed may be determined in advance according to the amount of cooling water that is set in accordance with charging conditions under which the battery is to be charged, and the charging conditions may include at least one of a charging voltage, a charging current, a charging time, or a time point at which the charging rate is restricted.

For example, the cooling method may further include, upon determining that the amount of cooling water is insufficient, comparing predicted heat generation of the vehicle charging connection unit corresponding to the charging power with protective heat generation of the vehicle charging connection unit. The protective heat generation may be heat generation of the vehicle charging connection unit that is to be cooled by an insufficient amount of the cooling water. Step (b) may be performed when the predicted heat generation is greater than the protective heat generation.

For example, the predicted heat generation may be determined in advance in accordance with the charging conditions under which the battery is to be charged.

For example, the predicted heat generation may be determined in accordance with the charging voltage as follows.

$$Te=(A \times Tc) \times (B \times Ic2 + C \times Ic + D)$$

Here, Te represents the predicted heat generation, Tc represents the charging time, Ic represents the charging current, and A, B, C, and D represent parameters that are experimentally obtained.

For example, step (b) may include tracking a change in the temperature of the vehicle charging connection unit that is determined in advance in accordance with the charging conditions under which the battery is to be charged, and restricting the charging rate with reference to the tracking result so that the battery is charged within the shortest period of time under a condition in which the temperature of the vehicle charging connection unit becomes equal to or lower than a predetermined temperature.

For example, the cooling method may further include determining whether the charging power is high power having a level of 50 kW or more. Step (a) may be performed when the charging power is high power.

For example, the cooling method may be performed before supply of power from the charger to the battery via the vehicle charging connection unit is started, or may be performed after supply of power from the charger to the battery via the vehicle charging connection unit is started.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

The present disclosure will now be described more fully hereinafter with reference to the accompanying drawings, in which various embodiments are shown.

The examples, however, may be embodied in many different forms and should not be construed as being limited to the embodiments set forth herein. Rather, within the spirit and scope of the present disclosure, one or more components may be selectively and operatively combined or substituted.

Unless otherwise defined, all terms used herein (including technical and scientific terms) have the same meanings as commonly understood by those skilled in the art. It will be further understood that terms, such as those defined in commonly used dictionaries, should be interpreted as having meanings consistent with their meanings in the context of the relevant art.

Terms used in the specification are provided for description of the exemplary embodiments, and the present disclosure is not limited thereto. In the specification, singular forms in sentences include plural forms unless otherwise noted. The term "at least one" (or "one or more") should be understood as including all possible combinations that can be suggested from one or more relevant items. For example, the meaning of "at least one of a first item, a second item, or a third item" may be each of the first item, the second item, or the third item, and may also be all possible combinations that can be suggested from two or more of the first item, the second item, and the third item.

Additionally, terms such as "first", "second", "A", "B", "(a)", "(b)", etc. may be used herein to describe the components of the embodiments. These terms are only used to distinguish one element from another element, and the essence, order, or sequence of corresponding elements is not limited by these terms.

It should be noted that if it is described in the specification that one component is "connected", "coupled", or "joined" to another component, the former may be directly "connected", "coupled", or "joined" to the latter, or may be indirectly "connected", "coupled", or "joined" to the latter via another component.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

Hereinafter, an electric vehicle 100 according to an embodiment will be described with reference to the accompanying drawings.

Figure 1:
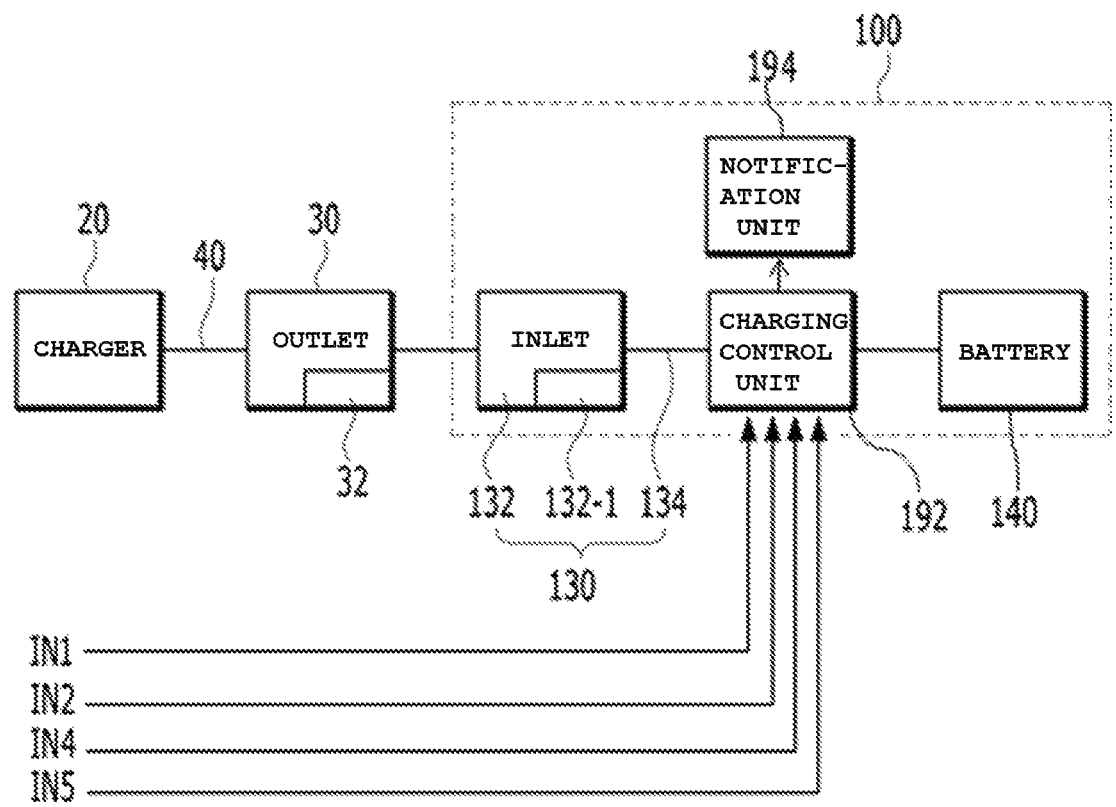
FIG. 1 is a schematic block diagram of a vehicle-charging system.

FIG. 1 is a schematic block diagram of a vehicle-charging system.

Referring to FIG. 1, the vehicle-charging system may include a charger 20, an outlet 30, and the electric vehicle 100 according to the embodiment.

The charger 20 may be located outside the electric vehicle 100, and may be a high-speed charger, a low-speed charger, or a low-speed charger for home use. The charger 20 may be connected to the outlet 30 via an external cable 40. That is, the outlet 30 may be disposed at the power-output side of the external cable 40, and may be connected to the electric vehicle 100. Further, the outlet 30 may include a fixing part 32 provided therein.

The electric vehicle 100 may include a vehicle charging connection unit 130, a charging control unit 192, a pump (not shown), and a battery 140. In addition, the electric vehicle 100 may further include a notification unit 194.

The vehicle charging connection unit 130 may be connected to the external cable 40, which is connected to the charger 20 located outside the electric vehicle 100. As illustrated, the vehicle charging connection unit 130 may be connected to the external cable 40 via the outlet 30, and may serve as an interface between the electric vehicle 100 and the external charger 20.

The vehicle charging connection unit 130 may include an inlet 132 and an internal cable 134.

The inlet 132 of the vehicle charging connection unit 130 may be connected to the outlet 30, and may include a locking part 132-1 provided therein. When the outlet 30 and the inlet 132 of the electric vehicle 100 are connected to each other, a path through which electric power from the charger 20 is charged to the battery 140 may be formed.

Although it is illustrated by way of example in FIG. 1 that a single outlet 30 and a single inlet 132 are provided, the embodiment is not limited thereto. In order to support both rapid charging and slow charging according to the type of the charger 20, two outlets 30 and two inlets 132 may be provided. In other words, the outlets 30 may include a high-speed outlet for use in rapid charging and a low-speed outlet for use in slow charging, and the inlets 132 may include a high-speed inlet for use in rapid charging and a low-speed inlet for use in slow charging. For convenience of explanation, a configuration in which a single outlet 30 and a single inlet 132 are provided will be described below.

The locking part 132-1 in the inlet 132 may be related to whether it is possible to start the electric vehicle 100. The fixing part 32 of the outlet 30 serves to secure the outlet 30 to the inlet 132. When the locking part 132-1 is not in a locked state or is in an unlocked state, the electric vehicle 100 may be started.

The charging control unit 192 may have a configuration integrating entities that control the components of the vehicle-charging system shown in FIG. 1, such as a battery management system (BMS), a vehicle control unit (VCU), and a motor control unit (MCU). Alternatively, the charging control unit 192 may be substantially divided into a battery management system, which controls the charging/discharging and the state of charge (SoC) of the battery 140, a vehicle control unit, which controls the overall operation of the vehicle, and a motor control unit, which controls the driving of the motor. However, the embodiment is not limited thereto.

The charging control unit 192 may receive from the inlet 132 a signal indicating whether the fixing part 32 of the outlet 30 is in a state of being fixed to the inlet 132, and may lock the locking part 132-1 included in the inlet 132. Specifically, the battery management system may receive from the inlet 132 a signal indicating that the fixing part 32 of the outlet 30 is in a fixed state, and may lock the locking part 132-1 of the inlet 132. That is, when it is desired to charge the electric vehicle 100 through the outlet 30, the fixing part 32 of the outlet 30 enters a fixed state. Upon detecting this state, the charging control unit 192 may lock the locking part 132-1 included in the inlet 132 of the electric vehicle 100 so as to prevent the electric vehicle 100 from being started during the charging operation. When the locking part 132-1 enters a fixed state, the battery management system constituting the charging control unit 192 may charge the battery 140.

In some cases, even when the charging control unit 192 performs control so as to lock the locking part 132-1, the locking part 132-1 may not actually enter a locked state. In this case, the battery management system may not receive the power required for charging the battery from the charger 20, and may indicate through the notification unit 194, including a cluster or a charging indication lamp, that the locking part 132-1 is not in a locked state. For example, the notification unit 194 may indicate corresponding information visually or acoustically.

When the charging is terminated, when the charging is completed, or when the charging is no longer requested, the fixing part 32 of the outlet 30 may enter an unfixed state, and the battery management system may receive from the inlet 132 a signal indicating that the fixing part 32 of the outlet 30 is in an unfixed state, and may release the locking of the locking part 132-1 of the inlet 132. When the locking of the locking part 132-1 is released, the charging control unit 192 may perform control such that the electric vehicle 100 is capable of being started.

The internal cable 134 is a part that is connected to the inlet 132. Although not illustrated, the internal cable 134 may serve to connect the high-speed charger and the low-speed charger, included in the electric vehicle 100, to each other.

Although it is illustrated by way of example in FIG. 1 that the vehicle charging connection unit 130 includes the inlet 132 and the internal cable 134, the embodiment is not limited thereto. The embodiment is not limited as to the specific configuration or operation of the vehicle charging connection unit 130.

When the power (hereinafter referred to as 'charging power') entering (supplied to or flowing into) the electric vehicle 100 from the external charger 20 is high power, any component in the electric vehicle 100 that may be overheated and damaged, or may catch fire, can correspond to the vehicle charging connection unit 130. Here, high power may be power having a magnitude of 50 kW or more, e.g. 200 kW or more. For example, high power may refer to the case in which a charging voltage is 400 V or more, preferably 1000 V or more, and in which a charging current is 125 A or more, preferably 200 A or more. However, the embodiment is not limited as to the specific values of the charging voltage and the charging current of the charging power. For example, in order to shorten the charging time of the battery 140, a high level of charging power may enter the electric vehicle 100.

As described above, the vehicle charging connection unit 130 connected to the charger 20 may serve to receive power from the charger 20 so that the battery 140 is charged. That is, the battery 140 may be charged with the charging power supplied from the outside to the electric vehicle 100 through the vehicle charging connection unit 130.

The vehicle charging connection unit 130 may be disposed in a flow path (or a pipe) through which cooling water is circulated, and may be cooled by the cooling water. To this end, the pump is disposed in the flow path through which the cooling water is circulated, and circulates the cooling water.

The path (hereinafter referred to as a "cooling water circulation path") in the electric vehicle 100, in which the vehicle charging connection unit 130 is disposed and through which the cooling water is circulated by the pump, may be formed in various configurations. One example of the cooling water circulation path will be described below with reference to FIG. 2. However, the configuration of the cooling water circulation path may be changed, and is not limited thereto.

Hereinafter, an embodiment 100A of the electric vehicle 100 shown in FIG. 1 will be described with reference to FIG. 2.

Figure 2:
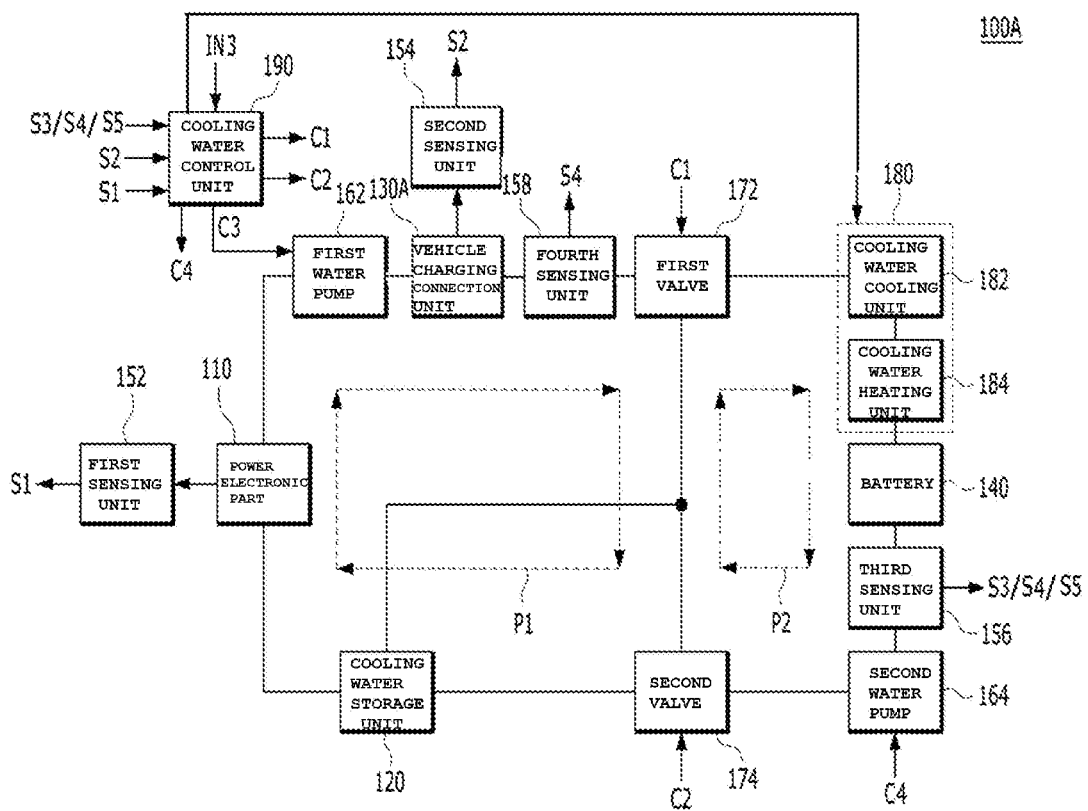
FIG. 2 illustrates a block diagram of an embodiment of the electric vehicle shown in FIG. 1.

FIG. 2 illustrates a block diagram of an embodiment 100A of the electric vehicle 100 shown in FIG. 1. Here, the line interconnecting the components 110, 120, 130A, 140, 162, 164, 172, 174 and 180 may correspond to a flow path through which the cooling water flows.

The flow path shown in FIG. 2 is just one example for helping understanding the flow path forming the cooling water circulation path included in the electric vehicle 100 shown in FIG. 1.

The electric vehicle 100A shown in FIG. 2 may include a vehicle charging connection unit 130A, a battery 140, and a first water pump 162. In addition, the electric vehicle 100A may further include at least one of a power electronic (PE) part 110, a cooling water storage unit 120, first to fourth sensing units 152, 154, 156 and 158, a second water pump 164, first and second valves 172 and 174, a cooling water temperature adjustment unit 180, or a cooling water control unit 190.

FIG. 2 is an exemplary view for explaining the flow path through which the cooling water flows. Thus, for convenience of explanation, illustration of the charging control unit 192 shown in FIG. 1 is omitted from FIG. 2. Since the vehicle charging connection unit 130A and the battery 140 shown in FIG. 2 respectively correspond to the vehicle charging connection unit 130 and the battery 140 shown in FIG. 1, a duplicate explanation thereof will be omitted. In addition, the first and second water pumps 162 and 164 shown in FIG. 2 may correspond to the pump described above with reference to FIG. 1.

The power electronic (PE) part 110 may be cooled by the cooling water. However, when the electric vehicle 100A is being charged in the same manner as described above, the operation of cooling the power electronic part 110 using the cooling water may not be performed.

The power electronic part 110 may refer to at least one of a general electronic part of the electric vehicle 100A or an electronic mechanism such as a motor. For example, the power electronic part 110 may be an electric motor (not shown) or an inverter (not shown). However, the embodiment is not limited as to the specific configuration of the power electronic part 110.

The cooling water storage unit 120 may be a kind of cooling water tank that serves to store the cooling water therein.

The power electronic part 110, the battery 140, and the vehicle charging connection unit 130A may be cooled by the cooling water that circulates through the cooling water circulation path included in the electric vehicle 100 and 100A. This cooling water circulation path may diverge into a plurality of circulation paths, or the divergent circulation paths may be integrated into one circulation path by controlling the valves. For example, referring to FIG. 2, the cooling water circulation path may diverge into first and second circulation paths P1 and P2, or the first and second circulation paths P1 and P2 may be integrated into one circulation path by controlling the opening/closing of the valves 172 and 174.

When the vehicle charging connection unit 130A is cooled, if the battery 140 and the vehicle charging connection unit 130A are placed in different cooling water circulation paths, the opening/closing of the valves may be controlled such that the battery 140 and the vehicle charging connection unit 130A are placed in the same cooling water circulation path. That is, when the vehicle charging connection unit 130A is cooled, the opening/closing of the valves 172 and 174 may be controlled such that the circulation path (e.g., P2 in FIG. 2), other than the circulation path (e.g., P1 in FIG. 2) in which the vehicle charging connection unit 130A is placed, is integrated with the circulation path (e.g., P1 in FIG. 2) in which the vehicle charging connection unit 130A is placed. As such, among the smallest divergent cooling water circulation paths, when the battery 140 and the vehicle charging connection unit 130A are not placed in the same circulation path, control may be performed such that the battery 140 and the vehicle charging connection unit 130A are placed in the same circulation path, with the result that the temperature of the battery may be effectively raised by the waste heat of the cooling water at the time point at which it is necessary to increase the temperature of the battery.

In the state in which the battery 140 and the vehicle charging connection unit 130A are designed to be placed in the smallest divergent cooling water circulation path, or in the state in which the battery 140 and the vehicle charging connection unit 130A, which are designed to be placed in different smallest divergent cooling water circulation paths, are controlled so as to be placed in the same cooling water circulation path through the control of the valves, the cooling water circulation path in which the vehicle charging connection unit 130A is placed may be integrated with other cooling water circulation paths when the vehicle charging connection unit 130A is cooled, thereby increasing the overall flow rate of the cooling water. As such, when the flow rate of the cooling water increases at the time of cooling the vehicle charging connection unit 130A, the cooling efficiency of the vehicle charging connection unit 130A may be further increased.

The cooling water for cooling the power electronic part 110 may circulate through the first circulation path P1 formed in the direction indicated by the arrows shown in FIG. 2. However, while the battery 140 is being charged, the power electronic part 110 of the electric vehicle 100A does not generate heat. Thus, the cooling water, which is liable to circulate through the first circulation path P1, may be used to cool the vehicle charging connection unit 130A, rather than cooling the power electronic part 110.

According to one embodiment, the vehicle charging connection unit 130A may be cooled using only the cooling water in the first circulation path P1. To this end, the opening/closing of the valves 172 and 174 may be controlled such that the first circulation path P1 and the second circulation path P2 are separated from each other. In this case, as shown in FIG. 2, the vehicle charging connection unit 130A may be placed in the first circulation path P1. For example, as illustrated in FIG. 2, the vehicle charging connection unit 130A may be disposed between the first water pump 162 and the first valve 172. Alternatively, unlike the configuration shown in FIG. 2, the vehicle charging connection unit 130A may be disposed between the power electronic part 110 and the cooling water storage unit 120. However, the embodiment is not limited as to the specific position at which the vehicle charging connection unit 130A is disposed, so long as the vehicle charging connection unit 130A is capable of being placed in the first circulation path P1.

According to another embodiment, the vehicle charging connection unit 130A may be cooled using both the cooling water in the first circulation path P1 and the cooling water in the second circulation path P2. To this end, the opening/ closing of the valves 172 and 174 may be controlled such that the first circulation path P1 and the second circulation path P2 are integrated with each other.

Compared to when the vehicle charging connection unit 130A is cooled using only the cooling water in the first circulation path P1, cooling efficiency may be increased when the vehicle charging connection unit 130A is cooled using both the cooling water in the first circulation path P1 and the cooling water in the second circulation path P2. This is because the amount of cooling water used to cool the vehicle charging connection unit 130A increases when all of the cooling water in the first and second circulation paths P1 and P2 is used, compared to when only the cooling water in the first circulation path P1 is used. Further, when all of the cooling water in the first and second circulation paths P1 and P2 is used, the length of the flow path through which the cooling water for cooling the vehicle charging connection unit 130A circulates increases. Accordingly, a section in which the circulating cooling water exchanges heat with the outside also increases, and thus the cooling water may be cooled during the circulation thereof.

According to still another embodiment, after being cooled by the cooling water in the first circulation path P1, the vehicle charging connection unit 130A may be further cooled using the cooling water in the second circulation path P2. To this end, when the vehicle charging connection unit 130A is cooled, the opening/closing of the valves 172 and 174 may be controlled such that the first circulation path P1 and the second circulation path P2 are initially separated from each other, and are thereafter integrated with each other. While the vehicle charging connection unit 130A is being cooled using only the cooling water in the first circulation path P1 in the state in which the first circulation path P1 and the second circulation path P2 are separated from each other, the cooling water in the second circulation path P2 is in a cold state. Thus, after the first and second circulation paths P1 and P2 are integrated with each other, the vehicle charging connection unit 130A may be cooled using the cold cooling water in the second circulation path P2, which leads to increased cooling efficiency.

In addition, when the first and second circulation paths P1 and P2 are integrated as described above, the vehicle charging connection unit 130A may be cooled using the cooling water cooled by a cooling water cooling unit 182. As such, when the vehicle charging connection unit 130A is cooled using all of the cooling water in the first and second circulation paths P1 and P2, the vehicle charging connection unit 130A may be placed in the first circulation path P1, as shown in FIG. 2. Alternatively, unlike the configuration shown in FIG. 2, the vehicle charging connection unit 130A may be placed in the second circulation path P2, through which the cooling water circulates in order to cool the battery 140. At this time, the vehicle charging connection unit 130A may be placed at various positions in the second circulation path P2.

The first sensing unit 152 may sense the temperature of the power electronic part 110, and may output the sensing result S1 (hereinafter referred to as a "first sensed temperature") to the cooling water control unit 190. To this end, as illustrated, the first sensing unit 152 may be disposed outside the first circulation path P1.

The second sensing unit 154 may sense the temperature of the vehicle charging connection unit 130A, and may output the sensing result S2 (hereinafter referred to as a "second sensed temperature") to the cooling water control unit 190. To this end, as illustrated, the second sensing unit 154 may be disposed outside the first circulation path P1.

According to one embodiment, the third sensing unit 156 may sense the temperature of the cooling water that was used to increase the temperature of the battery 140 and may output the sensing result S3 (hereinafter, referred to as a "third sensed temperature") to the cooling water control unit 190. To this end, the third sensing unit 156 is illustrated as being disposed between the battery 140 and the second water pump 164, but the embodiment is not limited thereto.

According to another embodiment, the third sensing unit 156 may sense the temperature of the cooling water to be used to increase the temperature of the battery 140 in the state in which the first circulation path P1 and the second circulation path P2 are integrated with each other (i.e. the cooling water that was used to cool the vehicle charging connection unit 130A), and may output the sensing result S4 (hereinafter, referred to as a "fourth sensed temperature") to the cooling water control unit 190. To this end, unlike the configuration shown in FIG. 2, the third sensing unit 156 may be disposed between the cooling water temperature adjustment unit 180 and the battery 140.

According to still another embodiment, the third sensing unit 156 may sense the temperature of the battery 140, and may output the sensing result S5 (hereinafter referred to as a "fifth sensed temperature") to the cooling water control unit 190. To this end, like the first sensing unit 152 and the second sensing unit 154, each of which is not disposed in the flow path through which the cooling water flows but is disposed outside the flow path, the third sensing unit 156 may not be disposed in the flow path through which the cooling water flows, but may be disposed outside the flow path.

The fourth sensing unit 158 may be disposed in the first circulation path P1, may directly sense the temperature of the cooling water that was used to cool the vehicle charging connection unit 130A, and may output the sensing result to the cooling water control unit 190. Here, the temperature of the cooling water that was used to cool the vehicle charging connection unit 130A, which is the result sensed by the fourth sensing unit 158, may correspond to the fourth sensed temperature S4 described above. For example, the fourth sensing unit 158, as shown in FIG. 2, may be disposed between the first valve 172 and the vehicle charging connection unit 130A. However, the embodiment is not limited thereto, and the fourth sensing unit 158 may be disposed at any point along the first circulation path P1.

Depending on whether the first circulation path P1 and the second circulation path P2 are in a separated state or in an integrated state, the electric vehicle 100A may include at least one of the second sensing unit 154 or the fourth sensing unit 158.

When the first circulation path P1 and the second circulation path P2 are in a separated state, the electric vehicle 100A, as shown in FIG. 2, may include both the second sensing unit 154 and the fourth sensing unit 158. Alternatively, the electric vehicle 100A may include only the fourth sensing unit 158, and the second sensing unit 154 may be omitted. When the second sensing unit 154 is omitted, the fourth sensing unit 158 may directly sense the temperature of the cooling water that was used to cool the vehicle charging connection unit 130A, and may indirectly sense the temperature of the vehicle charging connection unit 130A.

On the other hand, when the first circulation path P1 and the second circulation path P2 are in an integrated state, the electric vehicle 100A, as shown in FIG. 2, may include both the second sensing unit 154 and the fourth sensing unit 158. Alternatively, the electric vehicle 100A may include only the second sensing unit 154, and the fourth sensing unit 158 may be omitted. Alternatively, the electric vehicle 100A may include only the fourth sensing unit 158, and the second sensing unit 154 may be omitted. When the fourth sensing unit 158 is omitted, the third sensing unit 156 may directly sense the temperature of the cooling water that was used to cool the vehicle charging connection unit 130A so as to play the role of the fourth sensing unit 158. Alternatively, when the second sensing unit 154 is omitted, at least one of the third sensing unit 156 or the fourth sensing unit 158 may directly sense the temperature of the cooling water that was used to cool the vehicle charging connection unit 130A, and the fourth sensing unit 158 may indirectly measure the temperature of the vehicle charging connection unit 130A.

The first water pump 162 serves to circulate the cooling water. That is, the first water pump 162 may cause the cooling water to circulate through the first circulation path P1 formed in the direction indicated by the arrows.

In general, while the electric vehicle 100A is being charged, the power electronic part 110 is not cooled by the cooling water, and thus the first water pump 162 does not operate.

Figure 5:
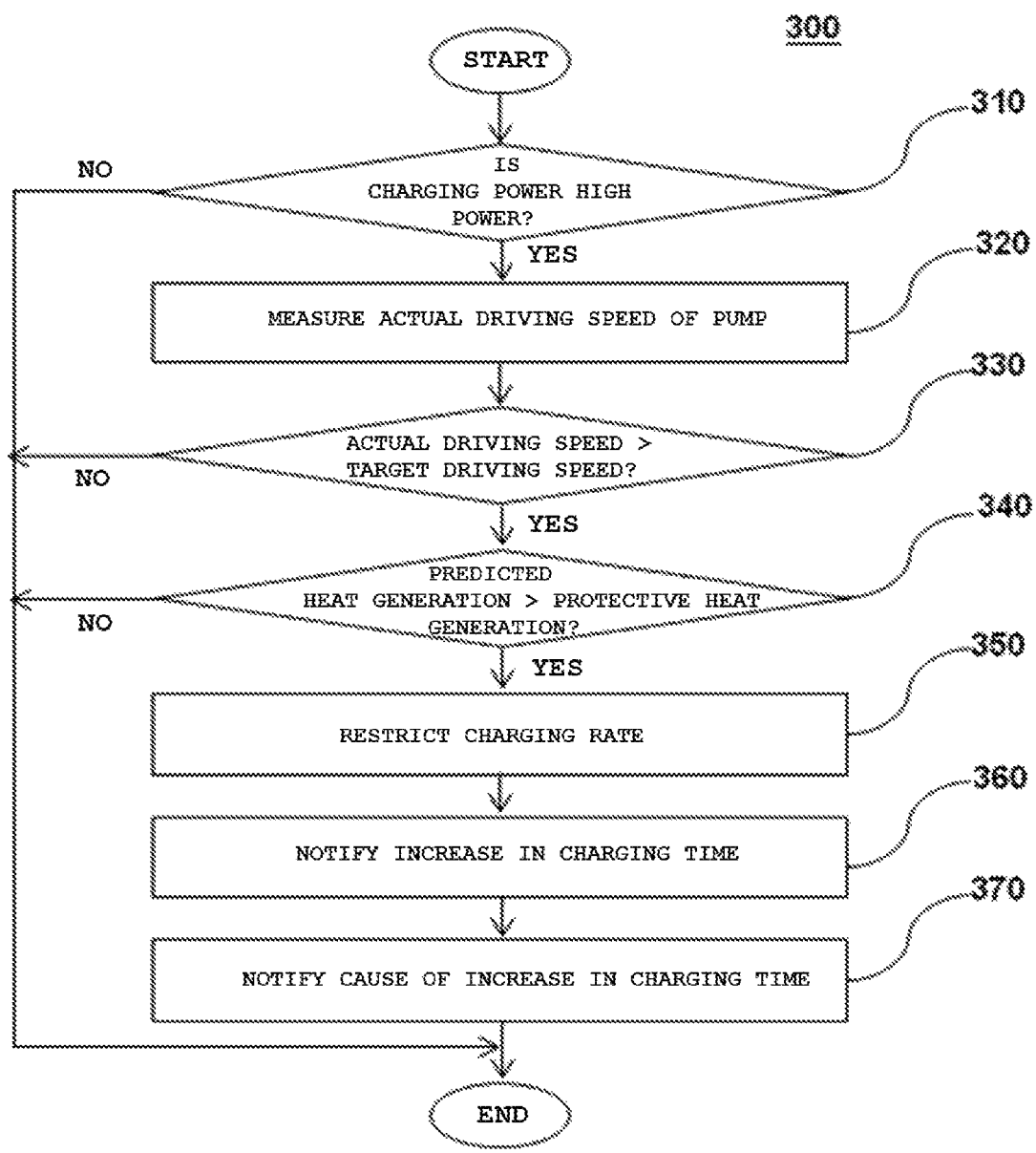
FIG. 5 is a flowchart illustrating a cooling method performed in an electric vehicle according to an embodiment.

However, according to one embodiment, the first water pump 162 may be operated to circulate the cooling water before the battery 140 of the electric vehicle 100A is charged, thereby performing a cooling method 300 of sensing shortage of the cooling water, which is shown in FIG. 5 to be described later. In this case, after the speed at which the battery 140 is charged is determined depending on whether there is a lack of the cooling water, the first water pump 162 may be operated to circulate the cooling water so as to cool the vehicle charging connection unit 130A or the vicinity of the vehicle charging connection unit 130A.

According to another embodiment, while the battery 140 of the electric vehicle 100A is being charged, the first water pump 162 may be operated to circulate the cooling water, thereby cooling the vehicle charging connection unit 130A or the vicinity of the vehicle charging connection unit 130A, and at the same time performing the method 300 shown in FIG. 5 to be described later.

As a result, according to the embodiments, in order to cool the power electronic part 110 or the vehicle charging connection unit 130A, the first water pump 162 serves to circulate the cooling water. For example, as illustrated in FIG. 2, the first water pump 162 may be disposed between the power electronic part 110 and the vehicle charging connection unit 130A, but the embodiment is not limited thereto.

The second water pump 164 also serves to circulate the cooling water. That is, the second water pump 164 may cause the cooling water to circulate through the second circulation path P2 formed in the direction indicated by the arrows, whereby the battery 140 may be cooled, or the temperature of the battery 140 may be increased. To this end, the second water pump 164 may be disposed between the second valve 174 and the battery 140, but the embodiment is not limited thereto.

The cooling water control unit 190 may further generate third and fourth control signals C3 and C4 for controlling the first and second water pumps 162 and 164, respectively. That is, the first water pump 162 may be driven in response to the third control signal C3, and the second water pump 164 may be driven in response to the fourth control signal C4. The information about the target driving speed at which the first water pump 162 is to be driven may be included in the third control signal C3, and the information about the target driving speed at which the second water pump 164 is to be driven may be included in the fourth control signal C4. The charging control unit 192 shown in FIG. 1 may control the cooling water control unit 190 so that the cooling water control unit 190 generates the third and fourth control signals C3 and C4.

In addition, the cooling water control unit 190 may serve to control the respective components shown in FIG. 2.

Each of the above-described first and second water pumps 162 and 164 may be an electric water pump (EWP), but the embodiment is not limited thereto.

At least one valve may be disposed between a plurality of circulation paths so as to separate or integrate the circulation paths from or with each other. To this end, the cooling water control unit 190 may control the opening/closing of the at least one valve. For example, referring to FIG. 2, the at least one valve may include first and second valves 172 and 174 disposed between the first circulation path P1 and the second circulation path P2. The first valve 172 may be opened or closed in response to a first control signal C1 output from the cooling water control unit 190, and the second valve 172 may be opened or closed in response to a second control signal C2 output from the cooling water control unit 190.

For better understanding, the arrangement and operation of the first and second valves 172 and 174 will be described below with reference to FIG. 2. However, the arrangement and operation of the first and second valves 172 and 174 are not limited to the following description.

The first valve 172 may be disposed between the battery 140, the cooling water storage unit 120, and the first water pump 162, and may be opened or closed in response to the first control signal C1 to control the flow of the cooling water.

The second valve 174 may be disposed between the first valve 172, the cooling water storage unit 120, and the second water pump 164, and may be opened or closed in response to the second control signal C2 to control the flow of the cooling water.

The cooling water control unit 190 may generate the first control signal C1 and transmit the same to the first valve 172, which is located at a branch point of the flow path through which the cooling water flows, so as to control the opening/closing of the flow path using the first valve 172. In addition, the cooling water control unit 190 may generate the second control signal C2 and transmit the same to the second valve 174, which is located at a branch point of the flow path through which the cooling water flows, so as to control the opening/closing of the flow path using the second valve 174. To this end, each of the first and second valves 172 and 174 may be a 3-way valve.

The cooling water control unit 190 may generate at least one of the first control signal C1 or the second control signal C2 in response to at least one of the first to fifth sensed temperatures S1 to S5, and may output the first and second control signals C1 and C2 to the first and second valves 172 and 174, respectively.

For example, the temperature of the cooling water that was used to cool the vehicle charging connection unit 130A may be provided to the cooling water control unit 190 via an input terminal IN3. Alternatively, when the temperature of the cooling water that was used to cool the vehicle charging connection unit 130A is provided via the input terminal IN3, the cooling water control unit 190 may measure the temperature of the cooling water that was used to cool the vehicle charging connection unit 130A. In this case, the fourth sensing unit 158 may be omitted.

At this time, according to the embodiment, in order to increase the temperature of at least one of the battery 140 or the power electronic part 110 using the cooling water that was used to cool the vehicle charging connection unit 130A, the cooling water control unit 190 may control the opening/closing of at least one of the first valve 172 or the second valve 174.

In addition, the cooling water temperature adjustment unit 180 may serve to adjust the temperature of the cooling water under the control of the cooling water control unit 190. As illustrated in FIG. 2, the cooling water temperature adjustment unit 180 may be disposed between the first valve 172 and the battery 140, but the embodiment is not limited thereto.

For example, the cooling water temperature adjustment unit 180 may include a cooling water cooling unit 182 and a cooling water heating unit 184.

The cooling water cooling unit 182 may be a battery chiller that serves to lower the temperature of the cooling water. The cooling water cooling unit 182 may be disposed between the first valve 172 and the battery 140, but the embodiment is not limited thereto. The cooling water cooling unit 182 may be disposed at any of various locations. For example, when at least one of the power electronic part 110 or the battery 140 is overheated, the temperature of at least one of the power electronic part 110 or the battery 140 may be lowered using the cooling water cooled by the cooling water cooling unit 182.

The cooling water heating unit 184 may heat the cooling water to a desired temperature, and may supply the heated cooling water to the battery 140. For example, the cooling water heating unit 184 may be disposed between the cooling water cooling unit 182 and the battery 140, or may be disposed between the first valve 172 and the cooling water cooling unit 182. However, the embodiment is not limited as to the specific location at which the cooling water heating unit 184 is disposed. In particular, the cooling water heating unit 184 may serve to heat the cooling water to an appropriate temperature when the electric vehicle 100A is first started. Therefore, the temperature of the battery 140 may be increased to a level appropriate for normal operation by the heated cooling water.

In some cases, at least one of the power electronic part 110, the first valve 172, the second valve 174, the second water pump 164, or the cooling water temperature adjustment unit 180, which is shown in FIG. 1, may be omitted.

Hereinafter, an example 200 of a cooling method performed in the electric vehicle 100A shown in FIG. 2 will be described with reference to FIG. 3.

Figure 3:
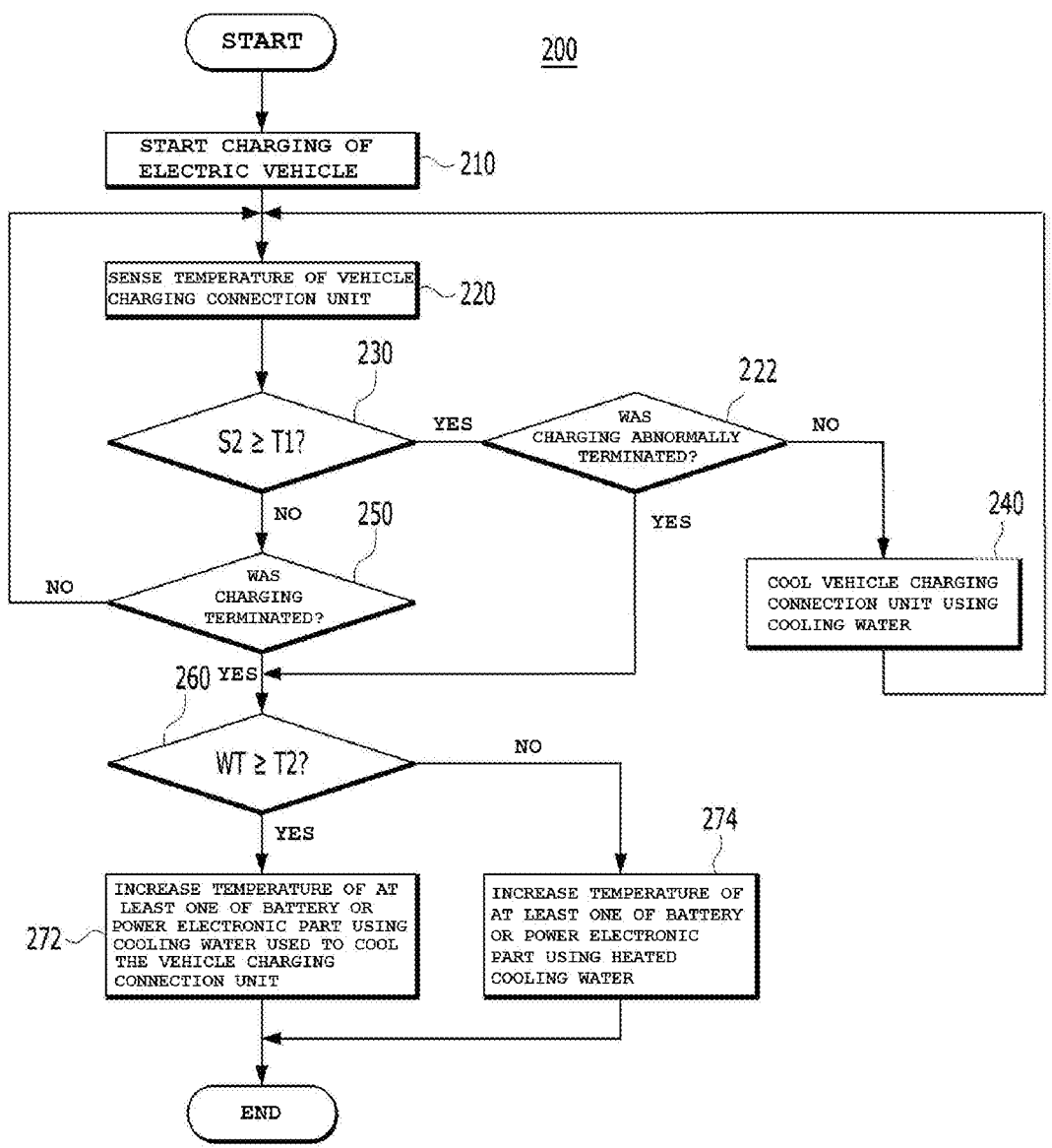
FIG. 3 is a flowchart for explaining a cooling method of the electric vehicle shown in FIGS. 1 and 2.

FIG. 3 is a flowchart for explaining the cooling method 200 of the electric vehicle 100 and 100A shown in FIGS. 1 and 2.

First, charging of the electric vehicle 100 and 100A is started (step 210). In order to perform step 210, the charger 20 may be connected to the vehicle charging connection unit 130 and 130A via the external cable 40 and the outlet 30, which are shown in FIG. 1, whereby charging of the power from the external charger 20 to the battery 140 may be started.

After step 210, the temperature of the vehicle charging connection unit 130A is sensed (step 220). Step 220 may be performed by the second sensing unit 154. Alternatively, in the case in which the second sensing unit 154 is omitted, step 220 may be performed by the fourth sensing unit 158, as described above.

After step 220, it is determined whether the second sensed temperature S2 of the vehicle charging connection unit 130A, sensed by the second sensing unit 154, is equal to or higher than a first predetermined temperature T1 (step 230). Step 230 may be performed by the cooling water control unit 190.

When the second sensed temperature S2 is equal to or higher than the first predetermined temperature T1, the vehicle charging connection unit 130A is cooled using the cooling water (step 240). Here, the first predetermined temperature T1 may be the temperature at which the vehicle charging connection unit 130A may burn or catch fire. That is, if the vehicle charging connection unit 130A is not cooled when the second sensed temperature S2 is equal to or higher than the first predetermined temperature T1, the vehicle charging connection unit 130A may burn or catch fire.

As described above, while the battery 140 of the electric vehicle 100 and 100A is being charged, the power electronic part 110 is not cooled by the cooling water. At this time, when the cooling water circulates through the first circulation path P1 formed in the direction indicated by the arrows due to the first water pump 162, the vehicle charging connection unit 130A may be cooled by the cooling water circulating through the first circulation path P1.

Alternatively, when the first circulation path P1 and the second circulation path P2 are integrated and the first and second water pumps 162 and 164 circulate the cooling water, the vehicle charging connection unit 130A may be cooled by the cooling water circulating through the first and second circulation paths P1 and P2.

In order to perform step 240, the cooling water control unit 190 may control the operation of at least one of the first water pump 162, the second water pump 164, the first valve 172, or the second valve 174 so that the cooling water circulates through the first circulation path P1 or the first and second circulation paths P1 and P2. For example, when a vehicle driving signal IG3 is transmitted to the cooling water control unit 190, the cooling water control unit 190 may operate a corresponding one of the members 162, 164, 172 and 174 described above.

In addition, according to the method 200 shown in FIG. 3, when the second sensed temperature S2 is equal to or higher than the first predetermined temperature T1, it may be further determined whether charging of the electric vehicle 100 and 100A was abnormally terminated (step 222). If charging of the electric vehicle 100 and 100A was not abnormally terminated, the process may proceed to step 240.

Charging of the electric vehicle 100 and 100A may be abnormally terminated for various reasons. For example, charging of the electric vehicle 100 and 100A may be abnormally terminated due to breakdown of the cooling system, such as a lack of the cooling water or breakdown of the pumps 162 and 164, a safety problem (associated with regulations), or a collision between the charger 20 and the electric vehicle 100 and 100A.

The reason why step 222 is performed in the method 300 is that, when charging of the electric vehicle 100 and 100A is abnormally terminated, even if the vehicle charging connection unit 130A is cooled in step 240, the components of the electric vehicle 100 and 100A may be damaged, or a fire may occur. Thus, when charging of the electric vehicle 100 and 100A is abnormally terminated, step 240 is not performed.

When the second sensed temperature S2 is lower than the first predetermined temperature T1, it is determined whether charging of the electric vehicle 100 and 100A has been terminated (step 250). Step 250 may be performed by the cooling water control unit 190. The "termination", which is determined in step 250, may mean either completion of charging of the electric vehicle 100 and 100A or abnormal termination of charging of the electric vehicle 100 and 100A.

When charging of the electric vehicle 100 and 100A has not been terminated, e.g. when charging of the electric vehicle 100 and 100A has not been completed, the process proceeds to step 220, and the second sensing unit 154 senses the temperature of the vehicle charging connection unit 130 again.

When charging of the electric vehicle 100 and 100A has been terminated, it is determined whether the temperature WT of the cooling water that was used to cool the vehicle charging connection unit 130 in step 240 is equal to or higher than a second predetermined temperature T2 (step 260). Step 260 may be performed by the cooling water control unit 190. The temperature WT of the cooling water that was used to cool the vehicle charging connection unit 130 may be sensed by the third or fourth sensing unit 156 or 158, as described above. That is, the temperature WT of the cooling water may correspond to the above-described fourth sensed temperature S4.

When the temperature WT of the cooling water that was used to cool the vehicle charging connection unit 130A is equal to or higher than the second predetermined temperature T2, the temperature of the battery 140 may be raised using the cooling water that was used to cool the vehicle charging connection unit 130A (step 272). In the state in which the first and second circulation paths P1 and P2 are separated from each other, in order to perform step 272, the cooling water control unit 190 may control opening/closing of the first and second valves 172 and 174 by outputting the first and second control signals C1 and C2 so that the first and second circulation paths P1 and P2 are integrated to supply the cooling water that was used to cool the vehicle charging connection unit 130A to the battery 140.

When the temperature WT of the cooling water that was used to cool the vehicle charging connection unit 130 is lower than the second predetermined temperature T2, the temperature of the battery 140 may be raised using the cooling water heated by the cooling water heating unit 184 (step 274). To this end, the cooling water control unit 190 may control the first valve 172 and the cooling water temperature adjustment unit 180 so that the heated cooling water increases the temperature of the battery 140.

Here, the second predetermined temperature T2 may be the temperature of the cooling water heated by the cooling water heating unit 184 to increase the temperature of the battery 140.

Alternatively, when the temperature WT of the cooling water that was used to cool the vehicle charging connection unit 130A is equal to or higher than the second predetermined temperature T2, the temperature of the power electronic part 110 may be raised using the cooling water that was used to cool the vehicle charging connection unit 130A (step 272). To this end, the cooling water control unit 190 may control the operation of at least one of the first water pump 162, the second water pump 164, the first valve 172, or the second valve 174 so that the cooling water that was used to cool the vehicle charging connection unit 130 is supplied to the power electronic part 110. For example, in the state in which the first and second circulation paths P1 and P2 are separated from each other, the cooling water control unit 190 may control the operation of the first water pump 162 so that the cooling water that was used to cool the vehicle charging connection unit 130 is supplied to the power electronic part 110. On the other hand, in the state in which the first and second circulation paths P1 and P2 are integrated with each other, the cooling water control unit 190 may control the operation of the first and second water pumps 162 and 164 so that the cooling water that was used to cool the vehicle charging connection unit 130 is supplied to the power electronic part 110.

When the temperature WT of the cooling water that was used to cool the vehicle charging connection unit 130 is lower than the second predetermined temperature T2, the temperature of the power electronic part 110 may be raised using the cooling water heated by the cooling water heating unit 184 (step 274). To this end, the cooling water control unit 190 may control at least one of the first water pump 162, the second water pump 164, the first valve 172, a second valve 174, or the cooling water temperature adjustment unit 180 so that the heated cooling water increases the temperature of the power electronic part 110. For example, in the state in which the first and second circulation paths P1 and P2 are separated from each other, the cooling water control unit 190 may control the first and second valves 172 and 174 so as to integrate the first and second circulation paths P1 and P2 with each other, and may operate the first and second water pumps 162 and 164 so that the cooling water heated by the cooling water heating unit 184 is supplied to the power electronic part 110.

Here, the second predetermined temperature T2 may be the temperature of the cooling water heated by the cooling water heating unit 184 to increase the temperature of the power electronic part 110.

Figure 4:
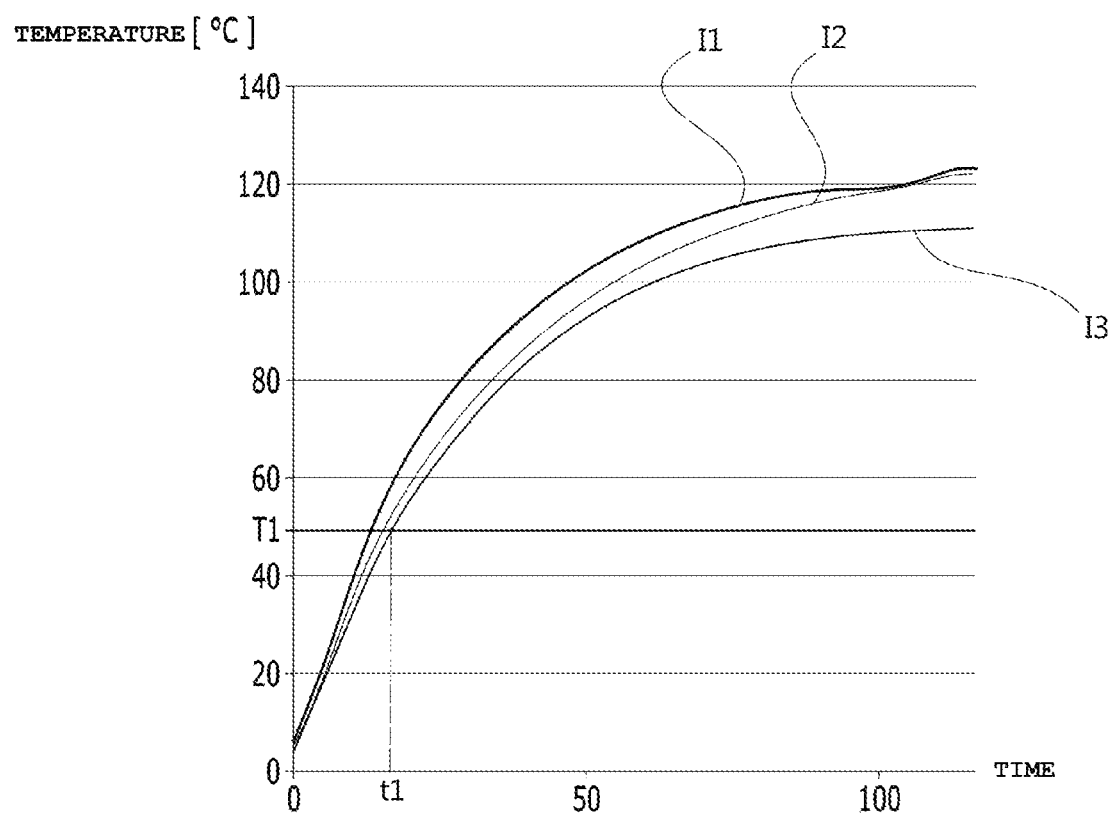
FIG. 4 is a graph showing a change in the temperature of a vehicle charging connection unit.

FIG. 4 is a graph showing a change in the temperature of the vehicle charging connection unit 130 and 130A, in which the horizontal axis represents a charging time, and the vertical axis represents the temperature of the vehicle charging connection unit 130A.

The temperature of the vehicle charging connection units 130 and 130A may vary depending on the intensity of the charging power (e.g. the charging current shown in FIG. 4) that is supplied to the electric vehicle 100 and 100A. For example, as the intensity of the charging current that is supplied per unit time increases, the temperature of the vehicle charging connection unit 130 and 130A may increase more rapidly. For example, referring to FIG. 4, a change in the temperature of the vehicle charging connection unit 130 and 130A over time when the charging current is 100 A (I2) is larger than when the charging current is 50 A (I3), and a change in the temperature of the vehicle charging connection unit 130 and 130A over time when the charging current is 150 A (I1) is larger than when the charging current is 100 A (I2).

If the vehicle charging connection unit 130 and 130A is not cooled during the charging operation, as shown in FIG. 4, as the time for which power is supplied from the external charger 20 to the electric vehicle 100 and 100A elapses, the temperature of the vehicle charging connection unit 130 and 130A continuously increases, and thus the vehicle charging connection unit 130 and 130A may be overheated and damaged, or may catch fire. In this case, the entire vehicle charging connection unit 130 and 130A needs to be replaced, which may incur cost and time associated with replacement.

However, according to the electric vehicle 100 and 100A and the cooling method 200 of the electric vehicle 100 and 100A shown in FIGS. 1 to 3, when the second sensed temperature of the vehicle charging connection unit 130 and 130A reaches the first predetermined temperature T1 or higher as the power is continuously supplied from the external charger 20, the vehicle charging connection unit 130 and 130A is cooled using the cooling water for cooling the power electronic part 110, whereby the temperature of the overheated vehicle charging connection unit 130 and 130A is lowered and the vehicle charging connection unit 130 and 130A is protected from a high temperature. For example, as shown in FIG. 4, the first predetermined temperature T1 may be 50° C., but the embodiment is not limited thereto. Therefore, it is possible to prevent the vehicle charging connection unit 130 and 130A of the electric vehicle 100 and 100A from burning or catching fire and to increase safety and satisfaction of a user of the electric vehicle 100 and 100A.

In general, the temperature of the power electronic part 110 or the battery 140 needs to be raised to a predetermined level so that the power electronic part 110 or the battery 140 normally operates. For example, when the power electronic part 110 or the battery 140 is used in an extremely low temperature environment, it may take time to heat the cooling water to be used to increase the temperature of the power electronic part 110 or the battery 140.

However, according to the electric vehicle 100 and 100A and the cooling method 200 of the electric vehicle 100 and 100A, after the vehicle is completely charged, the temperature of at least one of the power electronic part 110 or the battery 140 may be raised using the cooling water, the temperature of which has been raised to a predetermined level after cooling the vehicle charging connection unit 130 and 130A. Thus, it is possible to shorten the time required to increase the temperature of the power electronic part 100 or the battery 140, to increase charging efficiency, to shorten the overall charging time, and consequently to improve the fuel efficiency of the electric vehicle 100 and 100A compared to a related art.

In addition, according to the electric vehicle 100 and 100A and the cooling method 200 of the electric vehicle 100 and 100A, while the electric vehicle 100 and 100A is being charged, the vehicle charging connection unit 130 and 130A may be cooled using the cooling water that is used to cool the power electronic part 110. Therefore, the electric vehicle 100 and 100A according to the embodiment does not require additional hardware or equipment for cooling the vehicle charging connection unit 130 and 130A, and thus production costs may not be increased.

When the amount of cooling water used to cool the vehicle charging connection unit 130 and 130A is insufficient, the vehicle charging connection unit 130 and 130A may not be properly cooled, thus causing damage to the vehicle charging connection unit 130 and 130A or a fire at the vehicle charging connection unit 130 and 130A. In order to prevent this, according to the cooling method 30000 according to the embodiment, the charging control unit 192 shown in FIG. 1 may determine whether there is a lack of cooling water, and may control a charging rate at which the power is supplied to the electric vehicle 100 and 100A via the vehicle charging connection unit 130 and 130A depending on the determination result. Here, when the charging rate is high, the charging rate may be restricted so as to be reduced, and when the charging rate is low, the charging rate may be restricted so as not to exceed a predetermined level. For example, referring to FIG. 4, when the charging current that is supplied (or is to be supplied) per unit time is 150 A (I1) and the amount of cooling water is insufficient, if the charging rate is restricted by reducing the charging current (I1) that is supplied per unit time to 50 A (I3), it is possible not only to cool the vehicle charging connection unit 130 and 130A but also to prevent the vehicle charging connection unit 130 and 130A from burning or catching fire using an insufficient amount of cooling water. Here, the time ti may correspond to a time point at which the charging rate is restricted, which will be described later.

To this end, as shown in FIG. 1, the charging control unit 192 may be disposed between the vehicle charging connection unit 130 and the battery 140.

Hereinafter, a cooling method 300 according to an embodiment will be described with reference to the accompanying drawings.

FIG. 5 is a flowchart illustrating the cooling method 300 performed in an electric vehicle according to an embodiment.

Figure 6:
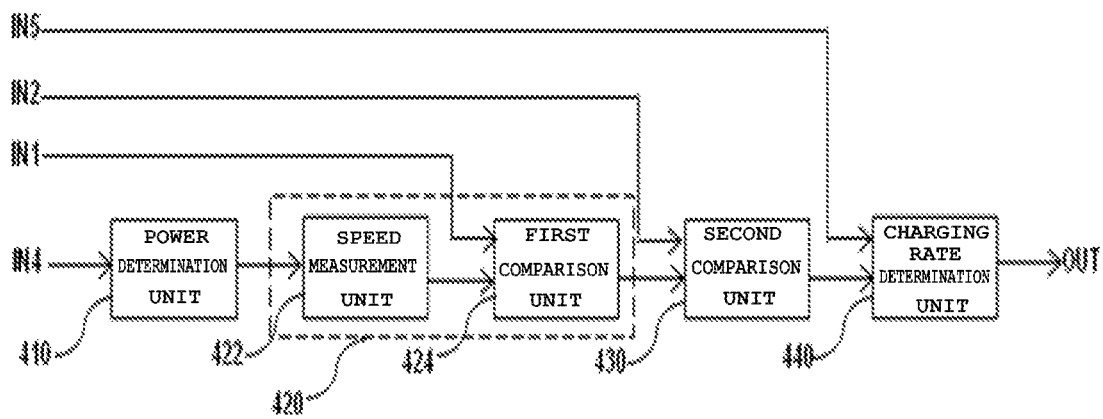
FIG. 6 is a block diagram of an embodiment of the charging control unit shown in FIG. 1.

FIG. 6 is a block diagram of an embodiment 192A of the charging control unit 192 shown in FIG. 1. The charging control unit 192A may include a cooling water determination unit 420 and a charging rate determination unit 440. In addition, the charging control unit 192A may further include a second comparison unit 430. In addition, the charging control unit 192A may further include a power determination unit 410.

For convenience, the cooling method 300 according to the embodiment shown in FIG. 5 will be described with reference to the electric vehicle 100 and 100A shown in FIGS. 1 and 2 and the charging control unit 192A shown in FIG. 6, but the embodiment is not limited thereto. That is, the cooling method 300 according to the embodiment shown in FIG. 5 may be performed in the electric vehicle 100 having a configuration different from the configuration shown in FIGS. 1 and 2 and the charging control unit 192 having a configuration different from the configuration shown in FIG. 6. For example, the cooling method 300 shown in FIG. 5 may also be performed in the electric vehicle 100A, which does not include the power electronic part 110, the cooling water storage unit 120, the first to fourth sensing units 152 to 158, the first and second valves 172 and 174, the second water pump 164, and the cooling water temperature adjustment unit 180, which are shown in FIG. 2, but includes only the vehicle charging connection unit 130A, the first water pump 162, and the battery 140.

First, it is determined whether the charging power supplied through the vehicle charging connection unit 130 and 130A of the electric vehicle 100 and 100A is high power (step 310).

In order to perform step 310, the power determination unit 410 may determine whether the charging power that is to be supplied or is being supplied to the battery 140 is high power, and may output the determination result to the cooling water determination unit 420. To this end, the power determination unit 410 may receive information about the charging power via the input terminal IN4.

When the charging power is high power, it may be determined whether the amount of cooling water is insufficient (steps 320 and 330). The reason why it is determined whether the amount of cooling water is insufficient when the charging power is high power (steps 320 and 330) is to prevent the vehicle charging connection unit 130 and 130A from burning or catching fire due to a lack of the cooling water when high power is supplied to the battery 140.

In order to perform steps 320 and 330, the cooling water determination unit 420 may determine whether the amount of cooling water circulating through the cooling water circulation path shown in FIG. 2 is insufficient in response to the determination result of the power determination unit 410, and may output the determination result as a determination signal. To this end, the cooling water determination unit 420 may include a speed measurement unit 422 and a first comparison unit 424.

Depending on the embodiment, step 310 may be omitted. In this case, the power determination unit 410 shown in FIG. 6 may also be omitted.

Steps 320 and 330 of determining whether the amount of cooling water is insufficient may be performed as follows.

First, when the charging power is high power, the actual driving speed of the pump is measured (step 320). That is, when the charging power is high power, step 320 may be performed.

Here, the pump may be at least one of the first water pump 162 or the second water pump 164. For example, as shown in FIG. 2, when the vehicle charging connection unit 130A is disposed in the first circulation path P1, the pump may be the first water pump 162. Unlike the configuration shown in FIG. 2, when the vehicle charging connection unit 130A is disposed in the second circulation path P2, the pump may be the second water pump 164.

Hereinafter, the method 300 shown in FIG. 5 will be described with reference to a configuration in which the vehicle charging connection unit 130A is disposed in the first circulation path P1.

In order to perform step 320, the speed measurement unit 422 may measure the actual driving speed of the pump, and may output the measurement result to the first comparison unit 424. As described above, even when the charging control unit 192 performs control such that the pump is driven at a target driving speed in response to the third control signal C3 output from the cooling water control unit 190, the actual driving speed of the first water pump 162 may differ from the target driving speed depending on whether the amount of cooling water is normal or insufficient. That is, when the amount of cooling water is insufficient, load of the pump (e.g., 162) circulating the cooling water is decreased. Therefore, when the amount of cooling water is insufficient, the pump may be driven at a higher speed than the target driving speed of the pump, which is set when the amount of cooling water is not insufficient but is normal.

After step 320, it is determined whether the measured actual driving speed of the pump is higher than the target driving speed of the pump (step 330). As such, it is possible to determine whether the amount of cooling water is insufficient by comparing the actual driving speed of the pump with the target driving speed. In order to perform step 330, the first comparison unit 424 may compare the actual driving speed measured by the speed measurement unit 422 with the target driving speed of the pump, and may output the comparison result as a determination signal.

The target driving speed may be determined in advance according to the amount of cooling water, which is set in accordance with the charging conditions under which the battery 140 is to be charged. That is, the target driving speed of the pump may be experimentally determined in advance according to the amount of cooling water, which is to circulate through the cooling water circulation path shown in FIG. 2 in accordance with the battery charging conditions such as charging power or charging time.

Here, the charging conditions may include at least one of a charging voltage, a charging current, a charging time, or a time point at which the charging rate is restricted. Here, the time point at which the charging rate is restricted may be determined to be a time point at which charging is possible within the shortest period of time without causing thermal damage to the components.

For example, the charging control unit 192 may control the cooling water control unit 190 in accordance with the charging conditions under which the battery 140 is to be charged. That is, the cooling water control unit 190 may generate the third control signal C3 for driving the first water pump 162 shown in FIG. 2 under the control of the charging control unit 192. The target driving speed may be provided to the first water pump 162 in the form of the third control signal C3.

In order to perform step 330, the first comparison unit 424 may receive a target driving speed from the outside via the input terminal IN1. The relationship between the driving speed of the pump and the required amount of cooling water for each charging condition may be determined in advance, and may be stored in the form of a look-up table (not shown).

When the amount of cooling water is insufficient, that is, when the actual driving speed of the pump is higher than the target driving speed, it is determined whether predicted heat generation of the vehicle charging connection unit 130 and 130A corresponding to the charging power is greater than protective heat generation of the vehicle charging connection unit 130 and 130A (step 340). Here, the "predicted heat generation" may mean the amount of heat that is predicted to be generated from the vehicle charging connection unit 130 and 130A (e.g. the internal cable 134) in accordance with the charging conditions under which the battery 140 is to be charged. The "protective heat generation" may mean heat generation of the vehicle charging connection unit 130 and 130A that is capable of being cooled by an insufficient amount of cooling water so as to prevent the vehicle charging connection unit 130 and 130A from overheating. That is, the "protective heat generation" may mean heat generation of the vehicle charging connection unit 130 and 130A that is capable of being cooled by an insufficient amount of cooling water.

For example, referring to the graph shown in FIG. 4, the amount of heat that is to be generated from the vehicle charging connection unit 130 and 130A in accordance with the charging current may be predicted.

According to the embodiment, the predicted heat generation may be experimentally determined in advance in accordance with the charging conditions under which the battery 140 is to be charged.

For example, when the charging conditions include a charging voltage, a charging current, and a charging time, the predicted heat generation may be determined in accordance with the charging voltage (e.g. 400 volts or 800 volts), which is expressed using Equation 1 below.

$$Te = (A \times Tc) \times (B \times Ic^2 + C \times Ic + D) \quad \text{[Equation 1]}$$

Here, Te represents the predicted heat generation, Tc represents the charging time, Ic represents the charging current, and A, B, C, and D represent parameters that are experimentally obtained.

In order to perform step 340, the second comparison unit 430 compares the predicted heat generation of the vehicle charging connection unit 130 and 130A corresponding to the charging power with the protective heat generation of the vehicle charging connection unit 130 and 130A in response to the determination signal output from the first comparison unit 424, and outputs the comparison result to the charging rate determination unit 440. That is, upon determining that the actual driving speed is higher than the target driving speed based on the determination signal output from the first comparison unit 424, the second comparison unit 430 may compare the predicted heat generation with the protective heat generation. To this end, the second comparison unit 430 may receive the predicted heat generation and the protective heat generation via the input terminal IN2. The predicted heat generation and the protective heat generation may be provided from the outside, or may be provided from the charging control unit 192 shown in FIG. 1.

Thereafter, when the amount of cooling water is insufficient and the predicted heat generation is greater than the protective heat generation, the charging rate at which the charging power is to be supplied or is being supplied to the battery 140 is restricted (step 350). When the amount of cooling water is insufficient but the predicted heat generation is not greater than the protective heat generation, the vehicle charging connection unit 130 and 130A is capable of being cooled by an insufficient amount of cooling water, and thus is prevented from being damaged or catching fire. Therefore, step 350 is not performed. However, when the amount of cooling water is insufficient and the predicted heat generation is greater than the protective heat generation, although the vehicle charging connection unit 130 and 130A is cooled by an insufficient amount of cooling water, it is not possible to prevent the vehicle charging connection unit 130 and 130A from being damaged or catching fire. Therefore, step 350 is performed.

The charging control unit 192 and 192A may track a change in the temperature of the vehicle charging connection unit 130 and 130A that was determined in advance in accordance with the charging conditions under which the battery 140 is to be charged, and may restrict the charging rate with reference to the tracking result so that the battery 140 is charged within the shortest period of time under the condition in which the temperature of the vehicle charging connection unit 130 and 130A becomes equal to or lower than a predetermined temperature. For example, the charging rate may mean the intensity of the charging current that is supplied to the battery 140 per unit time.

Hereinafter, detailed description of step 350 will be given.

Step 340 shown in FIG. 5 and the second comparison unit 430 shown in FIG. 6 may be omitted. In this case, in order to perform step 350, upon determining that the actual driving speed is higher than the target driving speed based on the comparison result from the first comparison unit 424, the charging rate determination unit 440 may restrict the charging rate at which the charging power is to be supplied to the battery 140 via the vehicle charging connection unit 130 and 130A.

However, when the second comparison unit 430 and step 340 are not omitted, in order to perform step 350, the charging rate determination unit 440 may restrict the charging speed at which the charging power is to be supplied to the battery 140 to a predetermined level in response to the comparison result from the second comparison unit 430o. For example, upon determining that the predicted heat generation is greater than the protective heat generation based on the comparison result from the second comparison unit 430, the charging rate determination unit 440 may restrict the charging rate at which the charging power is to be supplied to the battery 140.

For example, the charging rate may be restricted by lowering the level of the charging current and increasing the charging time. That is, when the charging rate is high, the charging rate may be restricted so as to be reduced, and when the charging rate is low, the charging rate may be restricted so as not to exceed a predetermined level. For example, the amount of charging (e.g. the level of the charging current) may be restricted using the difference between the predicted heat generation and the protective heat generation.

Referring to FIG. 1, the charging control unit 192 is disposed in the path through which the power is supplied from the charger 20 to the battery 140. For example, referring to FIG. 6, the charging power that is to be supplied from the charger 20 to the battery 140 via the outlet 30 may be provided from the inlet 132 to the charging rate determination unit 440 via the input terminal IN5. At this time, when the charging rate determination unit 440 restricts the charging speed in response to the comparison result from the second comparison unit 430, the charging rate determination unit 440 may output the charging power corresponding to the restricted charging rate to the battery 140 via the output terminal OUT. At this time, when the charging power is provided to the charging rate determination unit 440 at a rate higher than the restricted charging rate, the charging rate determination unit 440 may discharge extra power to the ground GND.

However, upon determining that the actual driving speed is not higher than the target driving speed based on the determination signal output from the first comparison unit 424 or that the predicted heat generation is not greater than the protective heat generation based on the comparison result output from the second comparison unit 430, the charging rate determination unit 440 does not restrict the charging rate. In this case, the charging rate determination unit 440 may transmit the charging power received via the input terminal IN5 to the battery 140 via the output terminal OUT without restricting the charging rate.

In addition, after step 350, when the charging rate is restricted, the user may be notified that the charging time required to charge the battery 140 is increased (step 360).

In addition, the cause of the increase in the charging time may also be notified (step 370). As described above, the user may be notified that the increase in the charging time is caused by the shortage of the cooling water.

As shown in FIG. 5, step 370 may be performed after step 360 is performed. Alternatively, unlike the method shown in FIG. 5, step 360 and step 370 may be performed simultaneously, or step 360 may be performed after step 370 is performed. As shown in FIG. 5, both step 360 and step 370 may be performed. Alternatively, unlike the method shown in FIG. 5, only one of step 360 and step 370 may be performed.

For example, after step 350, the user may be notified that "the level of the current supplied per unit time is reduced and the charging time is increased due to the shortage of the cooling water during the high-power charging operation" in at least one of a visual manner or an acoustic manner (steps 360 and 370).

The notification unit 194 shown in FIG. 1 may perform at least one of step 360 or step 370. To this end, when the charging rate is restricted, the charging rate determination unit 440 may provide the information about the restriction of the charging rate to the notification unit 194 via the output terminal OUT. Upon receiving the information about the restriction of the charging rate from the charging rate determination unit 440, the notification unit 194 may output a message corresponding thereto to the outside.

According to one embodiment, the above-described cooling method 300 of the electric vehicle shown in FIG. 5 may be performed before the supply of power from the charger 20 to the battery 140 via the vehicle charging connection unit 130 and 130A is started. That is, the cooling method 300 shown in FIG. 5 may be performed before step 210 shown in FIG. 3 is performed. In this case, according to the method shown in FIG. 5, when it is determined that the charging power is not a high power, the process may proceed to step 210 shown in FIG. 3 to start the supply of power to the battery 140. In addition, in this case, in order to determine whether the amount of cooling water is insufficient, before the supply of power from the charger 20 to the battery 140 via the vehicle charging connection unit 130 and 130A is started, the pump (e.g. the first water pump 162) may be forcibly driven in order to perform step 320.

According to another embodiment, the above-described cooling method 300 of the electric vehicle shown in FIG. 5 may be performed after the supply of power from the charger 20 to the battery 140 via the vehicle charging connection unit 130 and 130A is started. That is, the cooling method 300 shown in FIG. 5 may be performed after step 210 shown in FIG. 3 is performed. In this case, step 310 shown in FIG. 5 may be performed after step 210 shown in FIG. 3. In addition, in this case, since the second sensed temperature S2 shown in FIG. 3 is equal to or higher than the first predetermined temperature T1, the method shown in FIG. 5 may be performed before step 240 is performed. In this case, the pump (e.g. the first water pump 162) may be forcibly driven in order to perform step 320, rather than to cool the vehicle charging connection unit 130 and 130A.

Meanwhile, a recording medium on which a program for executing the cooling method 200 and 300 performed in the electric vehicle 100 and 100A is recorded may record a program for realizing a function of determining whether the amount of cooling water is insufficient and a function of restricting the charging rate at which the power is to be supplied to the battery 140 when the amount of cooling water is insufficient. The recording medium may be readable by a computer.

In addition, the function of determining whether the amount of cooling water is insufficient, which is realized by a program recorded on a computer-readable recording medium, may include a function of measuring the actual driving speed of the pump, a function of comparing the measured actual driving speed with the target driving speed of the pump, and a function of determining that the amount of cooling water is insufficient when the actual driving speed is higher than the target driving speed.

In addition, a program recorded on a recording medium on which a program for executing the cooling method 200 and 300 performed in the electric vehicle 100 and 100A is recorded may further realize a function of comparing the predicted heat generation of the vehicle charging connection unit 130 and 130A corresponding to the charging power with the protective heat generation of the vehicle charging connection unit 130 and 130A when the amount of cooling water is insufficient.

In addition, a program recorded on a recording medium on which a program for executing the cooling method 200 and 300 performed in the electric vehicle 100 and 100A is recorded may further realize at least one of a function of notifying that the charging time required to charge the battery 140 is increased or a function of notifying the cause of the increase in the charging time when the charging rate is restricted.

In addition, a program recorded on a recording medium on which a program for executing the cooling method 200 and 300 performed in the electric vehicle 100 and 100A is recorded may further realize a function of determining whether the charging power is high power.

The computer-readable medium includes all kinds of storage devices in which data that may be read by a computer system is stored. Examples of the computer-readable recording medium may include ROM, RAM, a CD-ROM, a magnetic tape, a floppy disk, and an optical data storage device. The computer-readable recording medium may also be distributed over network-coupled computer systems so that the computer-readable code is stored and executed in a distributed fashion. Also, functional programs, code, and code segments for accomplishing the above-described cooling method of an electric vehicle may be easily construed by programmers skilled in the art to which the present disclosure pertains.

In general, when high power is continuously supplied to the battery 140 via the vehicle charging connection unit 130 and 130A in the state in which the amount of cooling water is insufficient, the vehicle charging connection unit 130 and 130A may burn or catch fire. In particular, a fire may occur at the locking part 132-1 of the inlet 132 of the vehicle charging connection unit 130 and 130A and the internal cable 134, or at least one of the locking part 132-1 or the internal cable 134 may burn. In this case, since the entire charging port (e.g. the vehicle charging connection unit 130 and 130A) of the electric vehicle 100 and 100A needs to be replaced, the maintenance and repair costs of the electric vehicle 100 and 100A may be increased.

According to the electric vehicle 100 and 100A and the cooling method 300 according to the above-described embodiment, when the amount of cooling water is insufficient, the amount of current supplied to the battery 140 per unit time, i.e. the charging rate, is restricted. When the charging rate is restricted, i.e. when the level (or the amount) of the charging current that is supplied to the battery per unit time is reduced, the heat generation of the vehicle charging connection unit 130 and 130A may be reduced. Thus, according to the embodiment, even when the amount of cooling water is insufficient, it is possible to prevent the vehicle charging connection unit 130 and 130A from burning or catching fire.

Further, the cooling method 300 according to the above-described embodiment may be performed by the charging control unit 192 in a programmable manner, and thus no separate hardware is required.

Furthermore, according to the cooling method 30000 according to the above-described embodiment, when the amount of cooling water is insufficient, it is possible to prevent the vehicle charging connection unit 130 and 130A from burning or catching fire by restricting the charging rate or to notify a user of the electric vehicle 100 and 100A of at least one message indicating the shortage of the cooling water or the increase in the charging time. Therefore, the cooling method 30000 according to the above-described embodiment may enable the user to take a measure related to the shortage of the cooling water before the vehicle charging connection unit 130 and 130A burns or catches fire.

As a result, according to the electric vehicle 100 and 100A and the cooling method 300 thereof according to the embodiment, the maintenance and repair costs of the electric vehicle 100 and 100A may be reduced, the safety and reliability of the electric vehicle 100 and 100A may be improved, and satisfaction of a user may be increased.

As is apparent from the above description, according to the electric vehicle and the cooling method thereof according to the embodiment, when the amount of cooling water is insufficient, the heat generation of a vehicle charging connection unit may be reduced by restricting the amount of current supplied to a battery per unit time, i.e. the charging rate. Thus, even when the amount of cooling water is insufficient, it is possible to prevent the vehicle charging connection unit from burning or catching fire.

In addition, the cooling method of the electric vehicle according to the embodiment may be performed by a charging control unit in a programmable manner, and thus no separate hardware is required.

In addition, according to the electric vehicle and the cooling method thereof according to the embodiment, when the amount of cooling water is insufficient, it is possible to prevent the vehicle charging connection unit from burning or catching fire by restricting the charging rate or to notify a user of the electric vehicle of at least one message indicating the shortage of the cooling water or the increase in the charging time. Therefore, it is possible to enable the user to take a measure related to the shortage of the cooling water before the vehicle charging connection unit burns or catches fire.

In addition, according to the electric vehicle and the cooling method thereof according to the embodiment, the maintenance and repair costs of the electric vehicle may be reduced, the safety and reliability of the electric vehicle may be improved, and satisfaction of a user may be increased.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. An electric vehicle, comprising:
    a vehicle charging connection unit configured to be connected to an external cable connected to a charger located outside the electric vehicle, the vehicle charging connection unit being disposed in a flow path through which cooling water circulates so as to be cooled by the cooling water;
    a battery configured to be charged through the vehicle charging connection unit;
    a pump disposed in the flow path to circulate the cooling water; and
    a charging control unit configured to determine whether an amount of cooling water is insufficient and to restrict a charging rate of charging power supplied through the vehicle charging connection unit in response to a determination that the amount of cooling water is insufficient.

2. The electric vehicle according to claim 1, wherein the charging control unit comprises:
    a cooling water determination unit configured to determine whether the amount of cooling water is insufficient and to output a determination result as a determination signal; and
    a charging rate determination unit configured to restrict the charging rate of the charging power supplied through the vehicle charging connection unit in response to the determination signal.

3. The electric vehicle according to claim 2, wherein the cooling water determination unit comprises:
    a speed measurement unit configured to measure an actual driving speed of the pump; and
    a first comparison unit configured to compare the measured actual driving speed with a target driving speed of the pump and to output a comparison result as the determination signal.

4. The electric vehicle according to claim 2, wherein the charging control unit further comprises a second comparison unit configured to compare predicted heat generation of the vehicle charging connection unit corresponding to the charging power with protective heat generation of the vehicle charging connection unit in response to the determination signal;
    wherein the protective heat generation is heat generation of the vehicle charging connection unit that is to be cooled by an insufficient amount of the cooling water; and
    wherein the charging rate determination unit is configured to determine the charging rate in response to a comparison result from the second comparison unit.

5. The electric vehicle according to claim 2, wherein the charging control unit further comprises a power determination unit configured to determine whether the charging power is high power having a level of 50 kW or more; and
    wherein the cooling water determination unit is configured to operate in response to a determination result from the power determination unit.

6. The electric vehicle according to claim 1, wherein the electric vehicle further comprises a cooling water circulation path through which the cooling water circulates to cool a power electronic part, the battery, and the vehicle charging connection unit, and
    wherein the cooling water circulation path comprises a plurality of circulation paths that are separated from each other or integrated with each other using a valve.

7. The electric vehicle according to claim 6, further comprising a cooling water control unit configured to control the valve such that, if the battery and the vehicle charging connection unit are placed in different circulation paths when the vehicle charging connection unit is cooled, the battery and the vehicle charging connection unit are placed in a same circulation path.

8. The electric vehicle according to claim 6, further comprising a cooling water control unit configured to control the valve such that, when the vehicle charging connection unit is cooled, a circulation path, other than a circulation path in which the vehicle charging connection unit is placed, is integrated with the circulation path in which the vehicle charging connection unit is placed.

9. The electric vehicle according to claim 1, wherein the charging control unit is configured to track a change in temperature of the vehicle charging connection unit that is determined in advance in accordance with charging conditions under which the battery is to be charged, and to restrict the charging rate with reference to the tracking result so that the battery is charged within a shortest period of time under a condition in which the temperature of the vehicle charging connection unit becomes equal to or lower than a predetermined temperature, and
    wherein the charging conditions comprise a charging voltage, a charging current, a charging time, or a time point at which the charging rate is restricted.

10. A cooling method of an electric vehicle that comprises a vehicle charging connection unit connected to an external cable connected to a charger located outside the electric vehicle, a battery configured to be charged through the vehicle charging connection unit, and a pump configured to circulate cooling water to cool the vehicle charging connection unit, the cooling method comprising:
    determining whether an amount of cooling water is insufficient; and
    upon determining that the amount of cooling water is insufficient, restricting a charging rate of charging power supplied through the vehicle charging connection unit.

11. The cooling method according to claim 10, wherein the determining comprises:
  measuring an actual driving speed of the pump;
  comparing the measured actual driving speed with a target driving speed of the pump; and
  upon determining that the actual driving speed is higher than the target driving speed, determining that the amount of cooling water is insufficient.

12. The cooling method according to claim 11, wherein the target driving speed is determined in advance according to the amount of cooling water that is set in accordance with charging conditions under which the battery is to be charged; and
  wherein the charging conditions comprise a charging voltage, a charging current, a charging time, or a time point at which the charging rate is restricted.

13. The cooling method according to claim 12, further comprising, upon determining that the amount of cooling water is insufficient, comparing predicted heat generation of the vehicle charging connection unit corresponding to the charging power with protective heat generation of the vehicle charging connection unit;
  wherein the protective heat generation is heat generation of the vehicle charging connection unit that is to be cooled by an insufficient amount of the cooling water; and
  wherein the restricting is performed when the predicted heat generation is greater than the protective heat generation.

14. The cooling method according to claim 13, wherein the predicted heat generation is determined in advance in accordance with the charging conditions under which the battery is to be charged.

15. The cooling method according to claim 14, wherein the predicted heat generation is determined in accordance with the charging voltage as follows:

$$Te=(A \times Tc) \times (B \times Ic^2 + C \times Ic + D)$$

where Te represents the predicted heat generation, Tc represents the charging time, Ic represents the charging current, and A, B, C, and D represent parameters that are experimentally obtained.

16. The cooling method according to claim 14, wherein the restricting comprises:
  tracking a change in temperature of the vehicle charging connection unit that is determined in advance in accordance with the charging conditions under which the battery is to be charged; and
  restricting the charging rate with reference to the tracking result so that the battery is charged within a shortest period of time under a condition in which the temperature of the vehicle charging connection unit becomes equal to or lower than a predetermined temperature.

17. The cooling method according to claim 10, further comprising determining whether the charging power is high power having a level of 50 kW or more, wherein the determining is performed when the charging power is high power.

18. The cooling method according to claim 10, wherein the cooling method is performed before supply of power from the charger to the battery via the vehicle charging connection unit is started.

19. The cooling method according to claim 10, wherein the cooling method is performed after supply of power from the charger to the battery via the vehicle charging connection unit is started.

* * * * *

UNITED STATES PATENT AND TRADEMARK OFFICE
CERTIFICATE OF CORRECTION

PATENT NO. : 11,305,659 B2
APPLICATION NO. : 16/685421
DATED : April 19, 2022
INVENTOR(S) : Kyung Su Kim et al.

It is certified that error appears in the above-identified patent and that said Letters Patent is hereby corrected as shown below:

On the Title Page

Item (73), Assignees; Line 2, delete "Cornoration" and insert --Corporation--.

Signed and Sealed this
Seventh Day of June, 2022

Katherine Kelly Vidal
Director of the United States Patent and Trademark Office